(12) United States Patent
Drier et al.

(10) Patent No.: US 12,741,436 B1
(45) **Date of Patent: *Sep. 22, 2026**

(54) BALER WITH INTERNAL SCALE

(71) Applicant: WM Intellectual Property Holdings, L.L.C., Houston, TX (US)

(72) Inventors: Christopher Drier, Saint Louis, MO (US); Charles Searles, Houston, TX (US); Dennis Craig Siegel, Pleasant, PA (US)

(73) Assignee: WM Intellectual Property Holdings, L.L.C., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/758,436

(22) Filed: Jun. 28, 2024

Related U.S. Application Data

(63) Continuation of application No. 18/419,889, filed on Jan. 23, 2024, now Pat. No. 12,070,921.

(Continued)

(51) Int. Cl.
*B30B 9/30* (2006.01)
*B30B 15/00* (2006.01)
*G01G 19/52* (2006.01)

(52) U.S. Cl.
CPC ........ *B30B 9/3032* (2013.01); *B30B 15/0094* (2013.01); *G01G 19/52* (2013.01)

(58) Field of Classification Search
CPC ... B30B 15/0094; B30B 9/3032; B30B 15/26; G01G 19/52; G01G 19/00; A01F 2015/0891; B65B 13/20

(Continued)

(56) References Cited

U.S. PATENT DOCUMENTS 3,732,034 A 5/1973 Reid et al.
3,848,813 A 11/1974 Stanczyk et al.

(Continued)

FOREIGN PATENT DOCUMENTS

BE 1028913 A1 7/2022
CA 3035602 3/2018

(Continued)

OTHER PUBLICATIONS

Canadian Intellectual Property Office; Examiner Report, issued in connection to application No. 3,035,602; Sep. 29, 2023; 4 pages; Canada.

(Continued)

*Primary Examiner* — Jimmy T Nguyen
(74) *Attorney, Agent, or Firm* — Greenberg Traurig LLP

(57) ABSTRACT

A system and method for weighing of recyclable materials inside an industrial baler is provided. The baler can have an internal baler scale for weighing of recyclable materials. The baler can include an internal chamber enclosed by a safety gate at its upper portion and a door at its lower portion. Recyclable material can be loaded into the internal chamber and compressed by the action of a piston and associated piston face. The lower portion of the interior chamber can have a floor comprising a plurality of individual raised sections. The baler scale can sit atop the individual raised sections. The baler scale can include one or more load cells positioned under a base and in the gap space between the baler scale and the individual raised sections of the floor.

3 Claims, 8 Drawing Sheets

Related U.S. Application Data

(60) Provisional application No. 63/440,647, filed on Jan. 23, 2023.

(58) Field of Classification Search
USPC ...................................... 100/3, 99, 240, 245
See application file for complete search history.

(56) References Cited

U.S. PATENT DOCUMENTS 3,934,394 A 1/1976 Garrison
4,065,282 A 12/1977 Morey
4,191,511 A 3/1980 Stewart et al.
4,227,849 A 10/1980 Worthington
4,236,222 A 11/1980 Loshbough et al.
4,362,097 A 12/1982 Rogers
4,454,028 A 6/1984 Vetter et al.
4,460,131 A 7/1984 Cerroni
4,612,078 A 9/1986 Karp
4,730,790 A 3/1988 Williams
4,742,880 A 5/1988 Schrag et al.
4,874,134 A 10/1989 Wiens
5,071,075 A 12/1991 Wiens
5,101,977 A 4/1992 Roman
5,148,758 A 9/1992 Saly et al.
5,150,307 A 9/1992 McCourt et al.
5,184,780 A 2/1993 Wiens
5,213,593 A 5/1993 White, Jr.
5,250,100 A 10/1993 Armbristor
5,333,738 A 8/1994 Fuchs et al.
5,411,147 A 5/1995 Bond
5,551,218 A 9/1996 Henderson et al.
5,565,846 A 10/1996 Geiszler et al.
5,610,516 A 3/1997 Maier
5,649,785 A 7/1997 Djerf et al.
6,021,712 A 2/2000 Harrop
6,123,017 A 9/2000 Litle et al.
6,136,590 A 10/2000 Kruse
6,138,557 A 10/2000 Brown et al.
6,139,280 A 10/2000 Holt et al.
6,199,702 B1 3/2001 Buer
6,217,288 B1 4/2001 Mirsky et al.
6,230,780 B1 5/2001 Rietheimer
6,250,472 B1 6/2001 Grubbs et al.
6,264,038 B1 7/2001 Schmidt
6,378,276 B1 * 4/2002 Dorge .................... G01G 19/08 177/136
6,474,228 B1 11/2002 Leupe et al.
6,527,206 B1 3/2003 Wuebbels et al.
6,578,783 B2 6/2003 Simon et al.
6,593,853 B1 7/2003 Barrett et al.
6,633,798 B2 10/2003 Daniel et al.
6,787,713 B2 * 9/2004 Kuechenmeister .... G01G 17/04 177/244
6,974,097 B2 12/2005 Simon et al.
7,146,294 B1 12/2006 Waitkus, Jr.
7,293,415 B2 11/2007 Hoffmann et al.
7,389,880 B2 6/2008 Goldmann et al.
7,406,402 B1 7/2008 Waitkus, Jr.
7,503,513 B2 3/2009 Simon et al.
7,584,856 B2 9/2009 Miller et al.
7,674,055 B2 3/2010 Hiroike et al.
7,685,192 B1 3/2010 Scofield et al.
7,728,730 B2 6/2010 Langlois et al.
7,743,699 B1 6/2010 Freeman et al.
7,810,646 B2 10/2010 Miller et al.
7,892,500 B2 2/2011 Carner
7,897,884 B2 3/2011 Harish
7,957,937 B2 6/2011 Waitkus, Jr.
7,983,929 B2 7/2011 Zimmerman
8,006,734 B2 8/2011 Hajny et al.
8,046,192 B2 10/2011 Mcclain et al.
8,146,841 B2 4/2012 Andela
8,162,213 B2 4/2012 Larson et al.
8,165,890 B2 4/2012 Roberts
8,165,891 B2 4/2012 Roberts
8,211,211 B1 7/2012 Knaebel
8,275,630 B2 9/2012 Dunning
8,285,681 B2 10/2012 Prahlad et al.
8,311,975 B1 11/2012 Gonsalves
8,322,639 B2 12/2012 Gitschel
8,362,903 B2 1/2013 Lindh et al.
8,371,214 B1 2/2013 Correale et al.
8,392,135 B2 3/2013 Mcclain et al.
8,393,558 B2 3/2013 Gitschel
8,398,006 B2 3/2013 Gitschel
8,459,466 B2 6/2013 Duffy et al.
8,579,997 B2 11/2013 Bai
8,684,288 B2 4/2014 Gitschel
8,812,971 B2 8/2014 Benedek et al.
8,813,972 B1 8/2014 Centers
8,882,955 B2 11/2014 Brandon et al.
9,061,289 B2 6/2015 Gitschel
9,545,650 B2 1/2017 Wang et al.
9,649,666 B2 5/2017 Gitschel
9,713,812 B1 7/2017 Gitschel
9,884,324 B2 2/2018 Gitschel
9,913,429 B1 3/2018 Stubbs et al.
9,945,608 B2 4/2018 Ploeger et al.
10,021,859 B1 7/2018 Miller
10,311,394 B2 6/2019 Miller et al.
10,377,518 B2 8/2019 Waite et al.
10,438,281 B2 10/2019 Walsh et al.
10,464,105 B2 11/2019 Koistinen et al.
10,535,022 B1 1/2020 Hood et al.
10,564,029 B2 2/2020 Waite et al.
10,661,984 B2 5/2020 Chan et al.
10,678,272 B2 6/2020 Lattanzio et al.
10,793,377 B2 10/2020 Martin et al.
10,799,915 B2 10/2020 Horowitz et al.
10,835,927 B2 11/2020 Torriere
10,853,353 B2 12/2020 Balaraman et al.
10,864,555 B2 12/2020 Mccoy, Jr. et al.
10,984,394 B2 4/2021 Collins et al.
11,059,075 B2 7/2021 Mccoy, Jr. et al.
11,069,053 B2 7/2021 Horowitz et al.
11,117,169 B2 9/2021 Torriere
11,123,939 B2 9/2021 Chan et al.
11,148,383 B2 10/2021 Waite et al.
11,162,834 B2 11/2021 Waite et al.
11,241,854 B2 2/2022 Waite et al.
11,327,957 B2 5/2022 Su et al.
11,481,257 B2 10/2022 Sharma et al.
11,508,021 B2 11/2022 Hovhannisyan et al.
11,571,869 B2 2/2023 Chan et al.
11,651,334 B1 5/2023 Megyese et al.
11,673,703 B1 6/2023 Gaydos et al.
11,693,705 B2 7/2023 Sharma et al.
11,707,747 B1 7/2023 Torriere
11,717,857 B2 8/2023 Torriere
11,734,074 B2 8/2023 Sharma et al.
11,776,670 B1 10/2023 Walk et al.
11,780,190 B2 10/2023 Chan et al.
11,850,761 B2 12/2023 Peterson et al.
11,850,818 B2 12/2023 Chan et al.
11,875,296 B2 1/2024 Benjamin et al.
12,044,470 B2 7/2024 Christensen et al.
12,070,921 B1 * 8/2024 Drier ..................... B30B 9/3032
12,077,257 B2 9/2024 Maydanik
12,103,045 B2 10/2024 Kumar et al.
12,138,883 B2 11/2024 Chan et al.
12,139,293 B1 11/2024 Gaydos et al.
12,269,233 B2 4/2025 Chan et al.
12,440,852 B1 10/2025 Torriere
12,485,536 B2 12/2025 Byars et al.
12,496,618 B2 12/2025 Filler et al.
12,505,530 B2 12/2025 Lamb et al.
2002/0020175 A1 2/2002 Street et al.
2002/0108507 A1 8/2002 May et al.
2003/0028289 A1 2/2003 Daniel et al.
2003/0053906 A1 3/2003 Itou et al.
2003/0183705 A1 10/2003 Christiani et al.
2005/0015287 A1 1/2005 Beaver
2005/0065640 A1 3/2005 Mallett et al.
2005/0126958 A1 6/2005 Bohlig et al.

(56) References Cited

U.S. PATENT DOCUMENTS

2005/0183990 A1 8/2005 Corbett
2005/0197175 A1 9/2005 Anderson
2005/0209905 A2 9/2005 Ness et al.
2005/0242006 A1 11/2005 Bohlig et al.
2005/0280537 A1 12/2005 Feltz et al.
2006/0080819 A1 4/2006 Mcallister
2006/0254957 A1 11/2006 Bohlig et al.
2007/0102109 A1 5/2007 Katritzky et al.
2007/0209530 A1 9/2007 Viaud
2008/0041982 A1 2/2008 Paulson et al.
2008/0141714 A1 6/2008 Cartwright et al.
2008/0197058 A1 8/2008 Kenny
2008/0197194 A1 8/2008 Flood
2009/0008298 A1 1/2009 Studley
2009/0281677 A1 11/2009 Botich et al.
2010/0011717 A1 1/2010 Rivard
2010/0116881 A1 5/2010 Flood et al.
2010/0145629 A1 6/2010 Botich et al.
2010/0228601 A1 9/2010 Vaswani et al.
2010/0235209 A1 9/2010 Vaswani et al.
2010/0299097 A1 11/2010 Threlkeld et al.
2011/0071867 A1 3/2011 Chen et al.
2012/0004938 A1 1/2012 Beaver
2012/0029980 A1 2/2012 Paz
2012/0048129 A1 3/2012 Smith et al.
2012/0168354 A1 7/2012 Sundholm
2012/0199519 A1 8/2012 Ward
2012/0204740 A1 8/2012 Bergmann
2012/0217328 A1 8/2012 Bohlig et al.
2012/0266763 A1 10/2012 Foster et al.
2013/0008324 A1 1/2013 Verhaeghe et al.
2013/0132233 A1 5/2013 Rothley et al.
2013/0290511 A1 10/2013 Tu et al.
2014/0012553 A1 1/2014 Kelly et al.
2014/0156541 A1 6/2014 Waite et al.
2014/0157999 A1 6/2014 Verhaeghe et al.
2014/0214220 A1 7/2014 Kamel et al.
2014/0222665 A1 8/2014 Kamel et al.
2014/0236680 A1 8/2014 Chen et al.
2014/0303935 A1 10/2014 Kamel et al.
2014/0337107 A1 11/2014 Foster
2015/0199846 A1 7/2015 Sanderson et al.
2015/0204591 A1 7/2015 Burg et al.
2015/0283551 A1 10/2015 Gitschel
2015/0379785 A1 12/2015 Brown, Jr. et al.
2016/0014965 A1 1/2016 Naeyaert et al.
2016/0023417 A1 1/2016 Hanson et al.
2016/0081276 A1 3/2016 Riesterer et al.
2016/0088798 A1 3/2016 Lang et al.
2016/0166980 A1 6/2016 Pan et al.
2016/0187185 A1 6/2016 Smith
2016/0203146 A1 7/2016 Moll et al.
2016/0339445 A1 11/2016 Robinson
2017/0008671 A1 1/2017 Whitman et al.
2017/0011362 A1 1/2017 Whitman et al.
2017/0014868 A1 1/2017 Garcia, Jr. et al.
2017/0178066 A1 6/2017 High et al.
2017/0200135 A1 7/2017 Whitman et al.
2017/0202150 A1 7/2017 Smith
2017/0211969 A1 7/2017 Waite et al.
2017/0225199 A1 8/2017 Koistinen et al.
2017/0226439 A1 8/2017 Nguyen et al.
2017/0283292 A1 10/2017 Kim
2018/0037830 A1 2/2018 Bohlig et al.
2018/0056617 A1 3/2018 Chan et al.
2018/0056618 A1 3/2018 Chan et al.
2018/0057259 A1 3/2018 Chan et al.
2018/0112142 A1 4/2018 Foody et al.
2018/0229273 A1 8/2018 Carvajo Lucena et al.
2018/0268379 A1 9/2018 Collins et al.
2018/0364093 A1* 12/2018 Vasconcelos .......... G01G 21/28
2019/0030571 A1 1/2019 Horowitz et al.
2019/0039772 A1 2/2019 Le
2019/0039837 A1 2/2019 Zhou et al.
2019/0084012 A1 3/2019 Mccoy, Jr. et al.
2019/0130560 A1 5/2019 Horowitz et al.
2019/0148797 A1 5/2019 Paszti
2019/0217342 A1 7/2019 Parr et al.
2019/0224617 A1 7/2019 Mitariten
2019/0224935 A1* 7/2019 Waite .................. B65F 1/1405
2019/0249666 A1 8/2019 Lindberg et al.
2019/0293478 A1 9/2019 Waite et al.
2019/0304236 A1 10/2019 Chan et al.
2020/0010271 A1 1/2020 Bourn et al.
2020/0031513 A1 1/2020 Beach
2020/0048015 A1 2/2020 Martin et al.
2020/0087118 A1 3/2020 Sato et al.
2020/0129989 A1 4/2020 Schultz
2020/0164608 A1 5/2020 Waite et al.
2020/0171547 A1 6/2020 Torriere
2020/0197981 A1 6/2020 Neige et al.
2020/0222949 A1 7/2020 Murad et al.
2020/0338753 A1 10/2020 Schultz et al.
2020/0338758 A1 10/2020 Schultz et al.
2021/0012254 A1 1/2021 Campbell et al.
2021/0046513 A1 2/2021 Mccoy, Jr. et al.
2021/0060618 A1 3/2021 Torriere
2021/0086999 A1 3/2021 Martin et al.
2021/0094075 A1 4/2021 Horowitz et al.
2021/0094894 A1 4/2021 Whitmore
2021/0170707 A1 6/2021 Chan et al.
2021/0179366 A1 6/2021 Mccoy, Jr. et al.
2021/0206586 A1 7/2021 Douglas et al.
2021/0206588 A1 7/2021 Douglas et al.
2021/0217156 A1 7/2021 Balachandran et al.
2021/0290177 A1 9/2021 Novak, Jr. et al.
2021/0296008 A1 9/2021 Novak, Jr. et al.
2021/0327187 A1 10/2021 Wisniewski
2021/0328801 A1 10/2021 Sly et al.
2021/0335074 A1 10/2021 Cowles et al.
2021/0335458 A1 10/2021 Mcmullen
2021/0338102 A1 11/2021 Palacios et al.
2021/0375084 A1 12/2021 Aubrey et al.
2021/0402439 A1 12/2021 Torriere
2022/0027810 A1 1/2022 Murthy et al.
2022/0055071 A1 2/2022 Sharma et al.
2022/0108252 A1 4/2022 Narasimhan et al.
2022/0168898 A1 6/2022 Satat
2022/0180501 A1 6/2022 Perez
2022/0184855 A1 6/2022 Mleczko et al.
2022/0214273 A1 7/2022 Vandeputte et al.
2022/0230251 A1 7/2022 Kawamori et al.
2022/0274895 A1 9/2022 Mcconell
2022/0327538 A1 10/2022 Kumar et al.
2022/0343433 A1 10/2022 Yan et al.
2023/0061787 A1 3/2023 Feickert et al.
2023/0061958 A1 3/2023 Al Hosani et al.
2023/0120932 A1 4/2023 Parr et al.
2023/0144877 A1 5/2023 Soundarrajan et al.
2023/0173543 A1 6/2023 Kumar et al.
2023/0286239 A1 9/2023 Chan et al.
2023/0305565 A1 9/2023 Morris
2023/0312273 A1 10/2023 Teichrob et al.
2023/0381824 A1 11/2023 Dadlani
2023/0394495 A1 12/2023 Abdelsamic
2024/0034019 A1 2/2024 Chan et al.
2024/0037471 A1 2/2024 Jones et al.
2024/0059858 A1 2/2024 Huber et al.
2024/0075702 A1 3/2024 Chan et al.
2024/0085102 A1 3/2024 Christensen et al.
2024/0100567 A1 3/2024 Mckiver
2024/0183609 A1 6/2024 Christensen et al.
2024/0198390 A1 6/2024 Parr et al.
2024/0281713 A1 8/2024 Gupta et al.
2024/0338655 A1 10/2024 Vandeputte
2024/0417891 A1 12/2024 Yip et al.
2025/0018401 A1 1/2025 Torriere et al.
2025/0108408 A1 4/2025 Potter et al.
2025/0135497 A1 5/2025 Chevrette et al.

(56) References Cited

U.S. PATENT DOCUMENTS

| | | | |
|---|---|---|---|
| 2025/0166353 | A1 | 5/2025 | Luce et al. |
| 2026/0048529 | A1 | 2/2026 | Chevrette et al. |

FOREIGN PATENT DOCUMENTS

| | | | |
|---|---|---|---|
| CN | 204494897 | U | 7/2015 |
| CN | 206796893 | | 12/2017 |
| CN | 107697380 | | 2/2018 |
| CN | 108643104 | | 10/2018 |
| CN | 109178728 | | 1/2019 |
| CN | 110717368 | A | 1/2020 |
| CN | 112502953 | | 3/2021 |
| CN | 113998335 | A | 2/2022 |
| CN | 115111673 | A | 9/2022 |
| CN | 116967155 | A | 10/2023 |
| DE | 10006740 | A1 | 8/2001 |
| EP | 0557816 | A2 | 9/1993 |
| EP | 4272136 | | 11/2023 |
| GB | 2488996 | | 9/2012 |
| JP | 3145885 | U | 10/2008 |
| KR | 102865415 | B1 | 9/2025 |
| WO | 1999/037474 | | 7/1999 |
| WO | 03/031167 | | 4/2003 |
| WO | 2004/012866 | | 2/2004 |
| WO | 2018/044496 | A1 | 3/2018 |
| WO | 2018/057126 | | 3/2018 |
| WO | 2018/044498 | | 8/2018 |
| WO | 2019/195257 | | 10/2019 |
| WO | 2021/207240 | | 10/2021 |
| WO | 2022/146427 | | 7/2022 |
| WO | 2022/190230 | A1 | 9/2022 |
| WO | 2023/001935 | A1 | 1/2023 |
| WO | 2024/009118 | A1 | 1/2024 |
| WO | 2024/054552 | | 3/2024 |
| WO | 2026/039767 | A1 | 2/2026 |

OTHER PUBLICATIONS

Canadian Intellectual Property Office; Office Action, issued in connection to application No. 3035600, Mar. 13, 2024; 3 pages; Canada.

Canadian Intellectual Property Office; Office Action, issued in connection to patent application No. 3035600; Mar. 13, 2024; 3 pages; Canada.

International Search Report and Written Opinion, issued in connection to application No. PCT/US2017/045315, Oct. 30, 2017.

Mexican Institute of Industrial Property; Office Action, issued in connection to application No. MX/a/2019/002485; 4 pages; Aug. 25, 2023; Mexico.

Mexican Institute of Industrial Property; Office Action, issued in connection to application No. MX/a/2019/002485; 4 pages; Nov. 27, 2019; Mexico.

Mexican Institute of Industrial Property; Office Action, issued in connection to application No. MX/a/2019/002485; 5 pages; Apr. 30, 2019; Mexico.

The International Bureau of WIPO; PCT International Preliminary Report on Patentability, issued in connection to application PCT/US2017/045278; Mar. 5, 2019; 9 pages; Switzerland.

The International Bureau of WIPO; PCT International Preliminary Report on Patentability, issued in connection with application No. PCT/US2019/025345; 8 pages; Switzerland.

United States Patent and Trademark Office; PCT International Search Report, issued in connection to application PCT/US2017/045278; Nov. 2, 2017; 3 pages; US.

United States Patent and Trademark Office; PCT International Search Report, issued in connection with application No. PCT/US2019/025345; Jul. 22, 2019; 4 pages; US.

United States Patent and Trademark Office; PCT Written Opinion of the International Searching Authority, issued in connection to application PCT/US2017/045278; Nov. 2, 2017; 8 pages; US.

United States Patent and Trademark Office; PCT Written Opinion of the International Searching Authority, issued in connection with application No. PCT/US2019/025345; Jul. 22, 2019; 7 pages; US.

Mexican Institute of Industrial Property; Office Action, issued in connection to application No. MX/a/2019/002485; 5 pages; Feb. 16, 2024; Mexico.

Access Protocols for All State Offices and Facilities; Nov. 18, 2020; https://dbm.maryland.gov/employees/documents/covid-19%20building%20entry%20protocol.pdf; 2 pages.

Canadian Intellectual Property Office; Office Action, issued in connection to application No. 3,063,184; Mar. 28, 2025; 4 pages; Canada.

Canadian Intellectual Property Office; Office Action, issued in connection to application No. 3035601; Feb. 29, 2024; 3 pages; Canada.

Canadian Intellectual Property Office; Office Action, issued in connection to application No. 3095894; Jul. 31, 2025; 8 pages; Canada.

Couling, Tom; Recovering Recyclables Through Mixed Waste Processing; Public Works 124.n2:p53; Hanley-Wood, Inc.; Feb. 1993; 3 pages.

Crowdblink, Employee Health Screening App: Daily Covid-19 Assessments, Nov. 19, 2021.

EcoHeadge; Carbon Accounting Software: Streamline Your Sustainability Efforts; EcoHedge Ltd.; Jan. 8, 2024; 20 pages.

European Patent Office; PCT International Search Report, issued in connection to application No. PCT/US2023/032164; 7 pages; Apr. 9, 2024; Europe.

European Patent Office; PCT International Search Report, Issued in connection to PCT/US2025/042232; Dec. 16, 2025; 5 pages; Europe.

European Patent Office; PCT Written Opinion of the International Searching Authority, issued in connection to application No. PCT/US2023/032164; 13 pages; Apr. 9, 2024; Europe.

European Patent Office; PCT Written Opinion of the International Searching Authority, Issued in connection to PCT/US2025/042232; Dec. 16, 2025; 9 pages; Europe.

Goevo, Return to work safely and quickly with the Personal Protective App (PPA), Dec. 31, 2021.

Graniefuel Engineering; Alliance Dairies' RNG Plant; 2023; 4 pages.

Higley, Card Access Data Integration and Reporting During COVID-19, Aug. 31, 2020.

Humpston, Giles et al.; Identification of Fibre Composition of Apparel for Recycling; Dec. 31, 2015; 15 pages.

Kareem, Shefy Manayil; Introducing new ESG data and reporting capabilities in Microsoft Cloud for Sustainability; Jun. 15, 2023; 11 pages.

Kat, Jeff; Research Targets Sorting Robots and Separating Chemicals to Improve Plastic Recycling; https://www.forbes.com/sites/jeffkart/2021/01/15/research-targets-sorting-robots-and-separating-chemicals-to-improve-plastic-recycling/?sh=46705ab53fd1; Jan. 15, 2021; 4 pages.

Konstantinidis, Fotiios K. et al.; Multi-sensor cyber-physical sorting system (CPSS) based on Industry 4.0 principles: A multi-functional approach; Elsevier B.V.; 2022.

Lawton, George; 18 Sustainability Management Software Providers to Consider; Apr. 11, 2023; 10 pages.

Mathai, George et al.; HartEnergy: Controlling Reciprocating Compressors; Jul. 1, 2008; 10 pages.

Microsoft, Use the Employee Return to the Workplace app, Aug. 3, 2021.

Perennial Energy; Biogas Processing Systems; 2015; 2 pages.

Perez, Maria Marin; Analysis of European post-consumer textile waste for automated sorting; Dec. 31, 2021; 40 pages.

Public Works; Refuse Processing and Resource Recovery; Public Works 125 n5: pE22; Hanley-Wood, Inc.; Apr. 15, 1994; 18 pages.

Returnsafe, Health Screening Prior to Entering the Workplace, Nov. 19, 2021.

Riba, Jordi-Roger et al.; Post-Consumer Textile Waste Classification through Near-Infrared Spectroscopy, Using an Advanced Deep Learning Approach; Polymers; Jun. 17, 2022; 14 pages.

Ryerson, Introducing RyersonSafe for health screening process for all students, faculty, staff, visitor, Jul. 12, 2021.

(56) References Cited

OTHER PUBLICATIONS

Schneider, Robert J. et al.; Multilevel MRF Solves Solid Waste Challenges; BioCycle 34.5: 62.J.G.; Press Inc.; May 1993; 4 pages.
Servicenow, Configure Employee Health Screening, Dec. 31, 2021.
Spyridis, Yannis et al., Autonomous AI-enabled Industrial Sorting Pipeline for Advanced Textile Recycling; Apr. 29, 2024; 7 pages.
Spyridis, Yannis et al.; Textile Analysis for Recycling Automation using Transfer Learning and Zero-Shot Foundation Models; Jun. 6, 2025; 7 pages.
The International Bureau of WIPO; PCT International Preliminary Report on Patentability, issued in connection to application No. PCT/US2017/045294; Mar. 5, 2019; 7 pages; Switzerland.
The International Bureau of WIPO; PCT International Preliminary Report on Patentability, issued in connection to application No. PCT/US2023/032164; Mar. 20, 2025; 13 pages; Switzerland.
Toto, Deanne; AMP Robotics Introduces Material Characterization Software; https://www.wastetodaymagazine.com/article/amp-material-characterization-software-mf-operations/; Apr. 27, 2021; 11 pages.
U.S. Patent and Trademark Office; PCT International Search Report, issued in connection to application No. PCT/US2017/045294; Oct. 10, 2017; 2 pages; US.
U.S. Patent and Trademark Office; PCT Written Opinion of the International Searching Authority, issued in connection to application No. PCT/US2017/045294; Oct. 10, 2017; 6 pages; US.
Ullal, Mithun S., et al.; AI-enabled robotic sorting for circular textile waste management: A scalable solution for India's recycling sector, Nov. 1, 2025; pp. 876-882.
USCF, Daily Health Screening, Nov. 19, 2021; 3 pages.
VMWARE, Employee Experience When They Receive a Health Attestation Notification in Workspace ONE Intelligent Hub App, Sep. 1, 2021.
Waste Management, Inc et al.; Waste Management—Customer Communications; Te Ohio State University; 1 page; Apr. 14, 2019; U.S.
Waste Management: Customer Communication; Autumn 2018, Engineering 5901.01 Multidisciplinary Design Capstone; 265 pages; Dec. 7, 2018; U.S.
Wissenschaftszentrum Nordrhein-Westfalen; Analysis and Evaluation of the Possible Uses of Biomass; Aug. 1, 2005; http://www.biogaseinspeisung.de/download/Endberichet-Band3_FhG-IUSE.pdf; 236 pages; Germany.
Young, Ben et al.; A System for Standardizing and Combining U.S. Environmental Protection Agency Emissions and Waste Inventory Data; Applied Sciences; Mar. 28, 2022; 16 pages.

* cited by examiner

BALER WITH INTERNAL SCALE

RELATED APPLICATIONS

This application is a continuation application and claims the benefit, and priority benefit, of U.S. patent application Ser. No. 18/419,889, filed Jan. 23, 2024, which claims the benefit, and priority benefit, of U.S. Provisional Patent Application Ser. No. 63/440,647, filed Jan. 23, 2023, the disclosure and contents of which are incorporated by reference herein in their entirety.

BACKGROUND

Retail stores and other similar businesses collect and generate large amounts of potentially recyclable materials. For example, a retail store may initially receive and stock its inventory of goods in cardboard boxes. Goods may also be initially packaged using polystyrene, polyethylene, polypropylene, paper products, cloth, foam, film, bottles, glass, metal or other recyclable materials.

It is desirable for these businesses to be able to recycle these packaging materials quickly and efficiently. Moreover, these businesses may also want to measure and account for the total quantity of recyclable material that is collected.

It is known in the art to use industrial balers to compress recyclable materials for processing. It is also known in the art to use externally-located scales to measure the weight of the bales of recyclable materials that are produced by the balers. However, these previous scales have been inefficient and inconveniently located, among other disadvantages.

Improvements in this field of technology are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a baler for compressing recyclable materials is provided. The baler can include an internal chamber having a volume defined by a front door, a rear wall, a pair of side walls, a floor comprising a plurality of individual raised sections and a pluralty of floor gaps at spaced-apart intervals between the individual raised sections, and a piston face moveable by a piston and configured to compress the recyclable materials within the internal chamber to form a bale, and a baler scale comprising a base and one or more load cells, wherein the baler scale is configured to sit atop the floor and within the internal chamber, and wherein the one or more load cells are disposed beneath the base and the individual raised sections, and wherein the one or more load cells are configured to measure a weight of the recyclable materials when the recyclable materials rest atop the base.

In some aspects, the one or more load cells can be operatively connected to a computer panel and a display screen to communicate data regarding the weight of the materials being baled. The base can be modular and include a plurality of smaller segments that fit together to form a whole. The baler scale can include a rectangularly shaped base and the load cells can be located at the four corners of the rectangular shaped base. The base can have a plurality of elongated grooves formed therein, and the grooves can be aligned in a parallel orientation with one another and correspond to the location of the floor gaps between one of the individually raised sections on the floor of the baler. The baler scale can sit atop one of the individually raised sections on the floor inside the baler and the grooves can align with and sit within the floor gaps. A baling wire can be positioned under the bale of compressed material and sit within the grooves. A plurality of baler scales can sit atop the floor and within the internal chamber.

BRIEF DESCRIPTION OF THE DRAWINGS

A better understanding of the presently disclosed subject matter can be obtained when the following detailed description is considered in conjunction with the drawings and figures herein, wherein.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates to a system and method for weighing of recyclable materials inside an industrial baler. Illustrative embodiments of the presently disclosed system and method are shown in FIGS. 1-9 herein.

Figure 1:
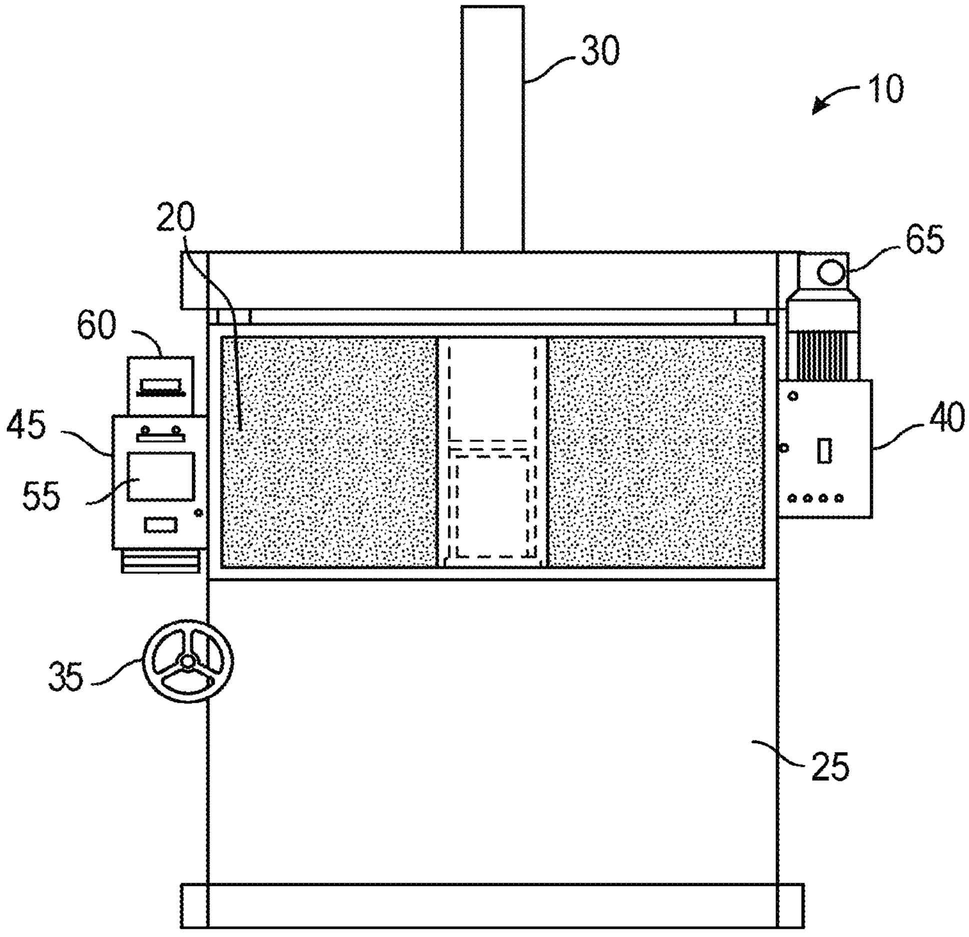
FIG. 1 is a front view of a baler in accordance with an illustrative embodiment of the presently disclosed subject matter.

In certain illustrative embodiments, the presently disclosed system and method utilize a baler 10 with an internal baler scale 85 for weighing of recyclable materials. As shown in FIG. 1, baler 10 can include an internal chamber enclosed by a safety gate 20 at its upper portion and a door 25 at its lower portion. Recyclable material can be loaded into the internal chamber and compressed by the action of a piston 30 and associated piston face 31. A door lock wheel 35 can be used with door 25 as a safety mechanism which requires door 25 to be locked during baling operations. Baler 10 can be controlled by a non-automated control panel 40 which controls functions such as, e.g., piston controls, power, panel door lock, etc. Baler 10 can also include a separate or integrated automated or "smart" control panel 45 which may house a computer processor 50 (not shown) which may be operably connected to various equipment such as a display screen 55, a printer 60, an imaging device 65 such as a camera, as well as other sensors and/or baler controls, etc.

Figure 2:
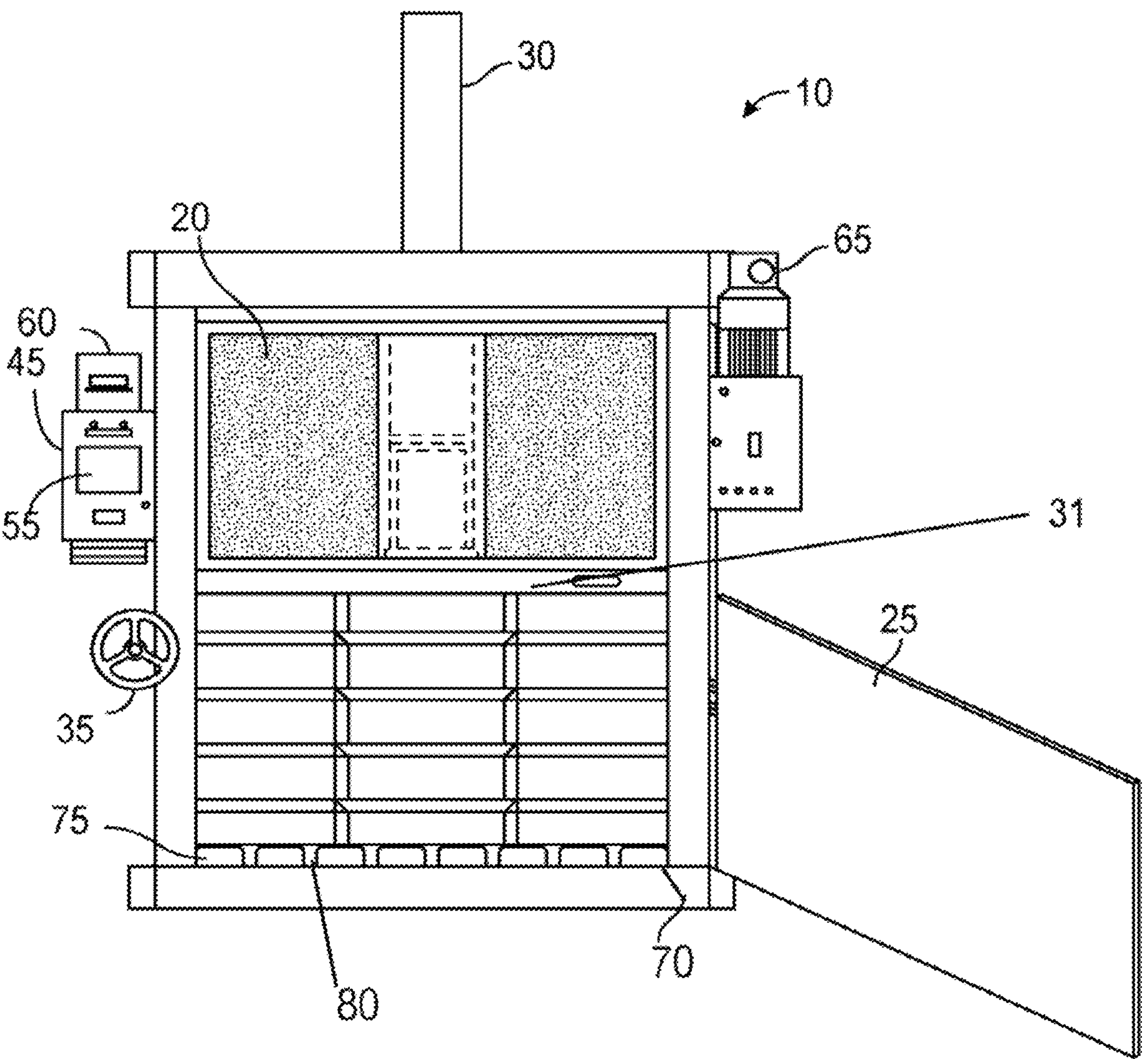
FIG. 2 is a front view of a baler with the door in an open position in accordance with an illustrative embodiment of the presently disclosed subject matter.
Figure 3:
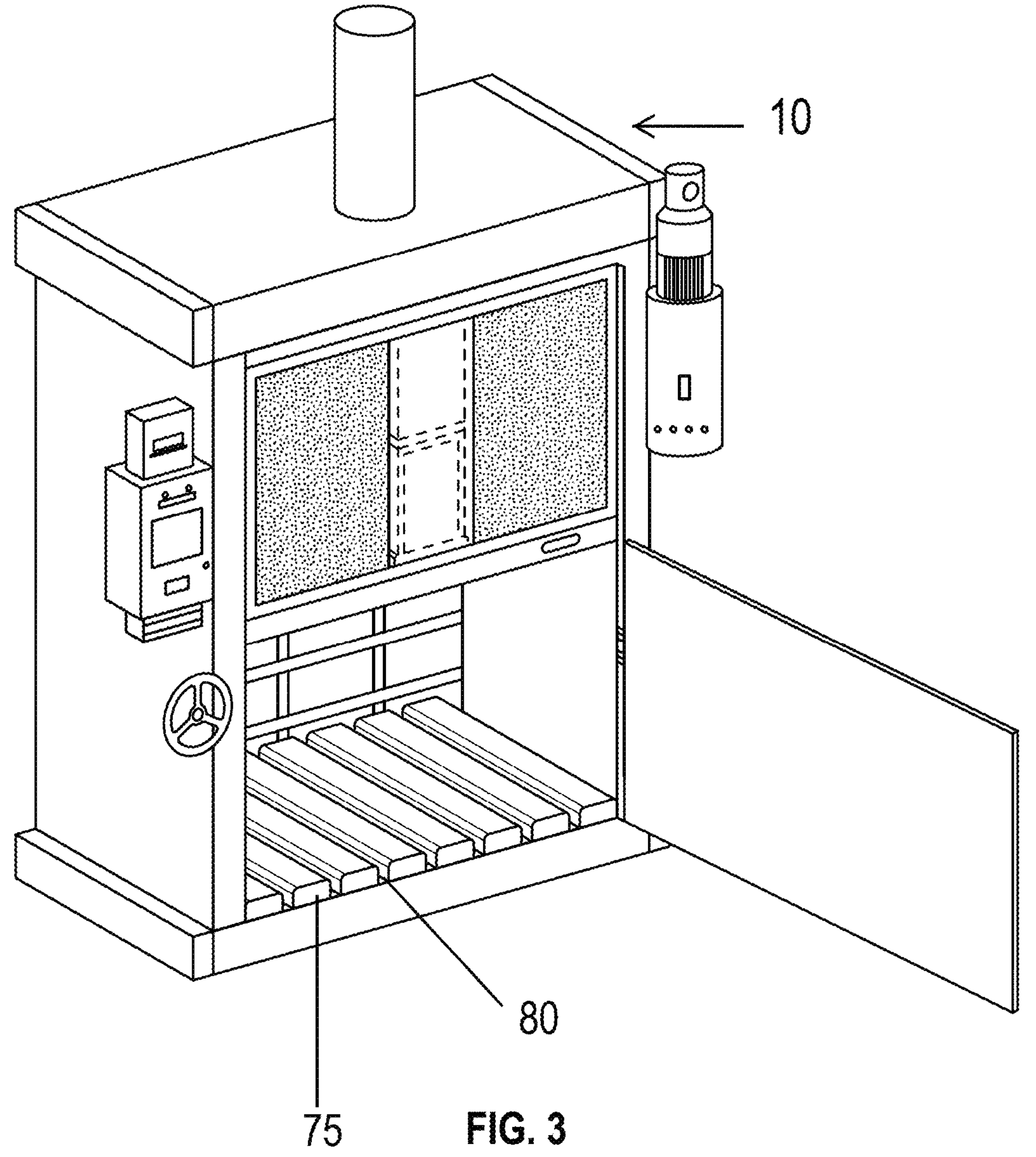
FIG. 3 is a perspective view of a baler with the door in an open position in accordance with an illustrative embodiment of the presently disclosed subject matter.

As shown in FIG. 2 (front view) and FIG. 3 (perspective view), the door 25 of baler 10 can swing out to an open position. The lower portion of the interior chamber of baler 10 can have a floor 70 comprising a plurality of individual raised sections 75 and a plurality of floor gaps 80 at spaced-apart intervals between the individual raised sections 75. Floor gaps 80 facilitate the insertion of baling wire under the bale of compressed material so that the bale can be tied and completed.

Figure 4:
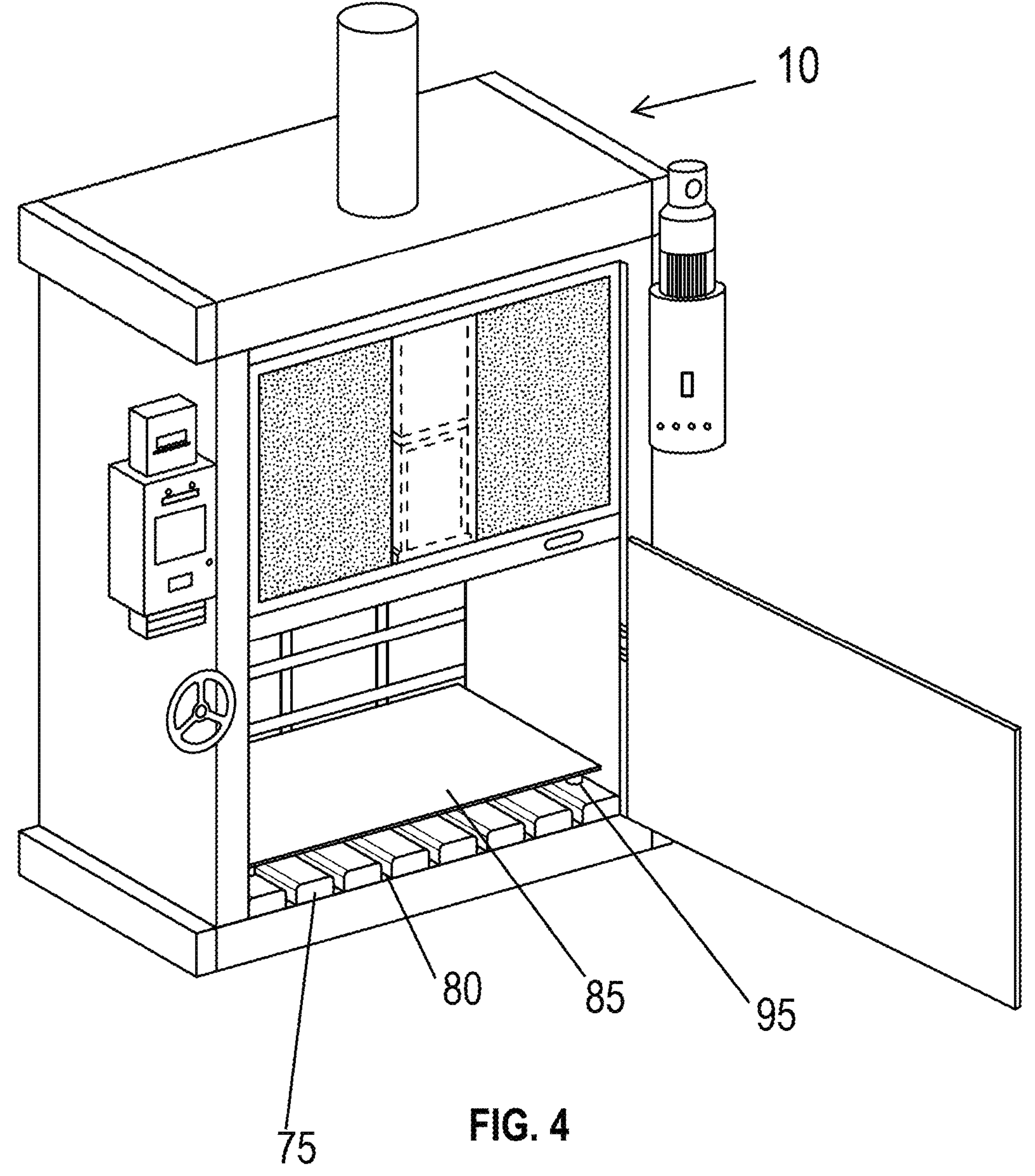
FIG. 4 is a perspective view of a baler with the door in an open position and a baler scale located inside the baler on the baler floor in accordance with an illustrative embodiment of the presently disclosed subject matter.
Figure 5:
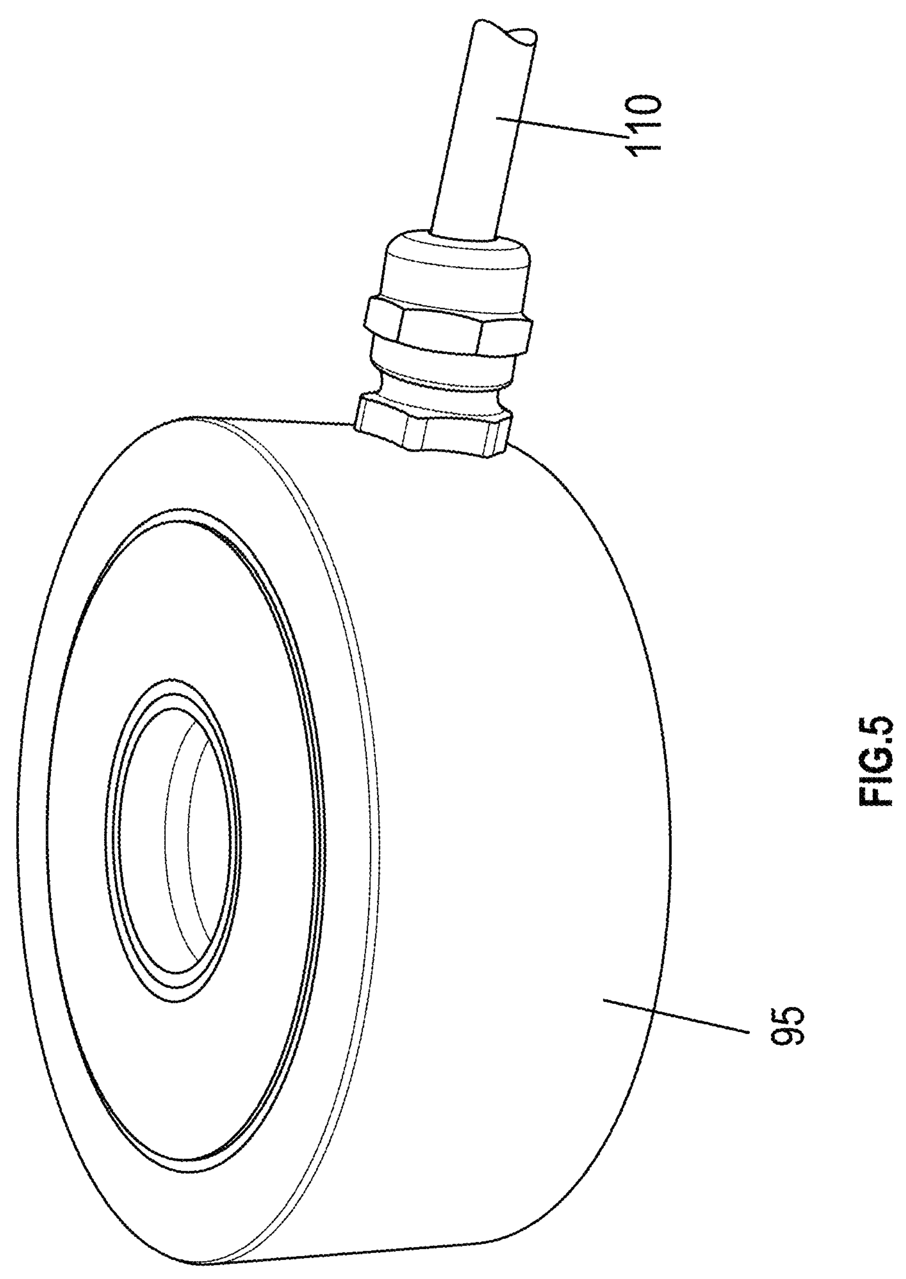
FIG. 5 is a perspective view of a load cell in accordance with an illustrative embodiment of the presently disclosed subject matter.

As shown in FIG. 4, a baler scale 85 can sit atop the individual raised sections 75 of floor 35 inside of baler 10. Baler scale 85 can include a generally flat-shaped base 90 (see FIG. 6) and one or more load cells 95 positioned under base 90 and in the gap space between the baler scale 85 and the individual raised sections 75 of floor 70. Load cells can be affixed to base 90 or detachable therefrom. Baler scale 85 can be used to weigh the recyclable materials collected in baler 10. Load cells 95 are force transducers that can convert force such as weight, compression, or pressure, into an electrical signal that can be measured and standardized. As the force applied to load cell 95 increases, the electrical signal can change proportionally. An illustration of a load cell 95 is shown in FIG. 5. Load cell 95 can be pneumatic, hydraulic, or the like. A representative example of a load cell 95 that can be utilized with baler 10 is the RLC ring torsion load cell sold by Mettler-Toledo of Columbus, Ohio.

In certain illustrative embodiments, load cell 95 can have wiring 110 or other means of connectivity (e.g., wireless) with smart control panel 45, computer processor 50 and display screen 55 of baler 10 to deliver an electric or other signal and communicate data as well as facilitate viewing of the current weight of the material being baled, minimum weight, maximum weight, etc., Moreover, load cells 95 can have on/off functionality, so that they can weigh recyclable material and/or communicate results to smart control panel 45 only when desired, such as, for example, only after the bale has been compressed and formed, and not during compression, or alternatively, load cells 95 can have continuous weighing functionality at all times including before, during and after compression.

Figures 6A, 6B, 6C:
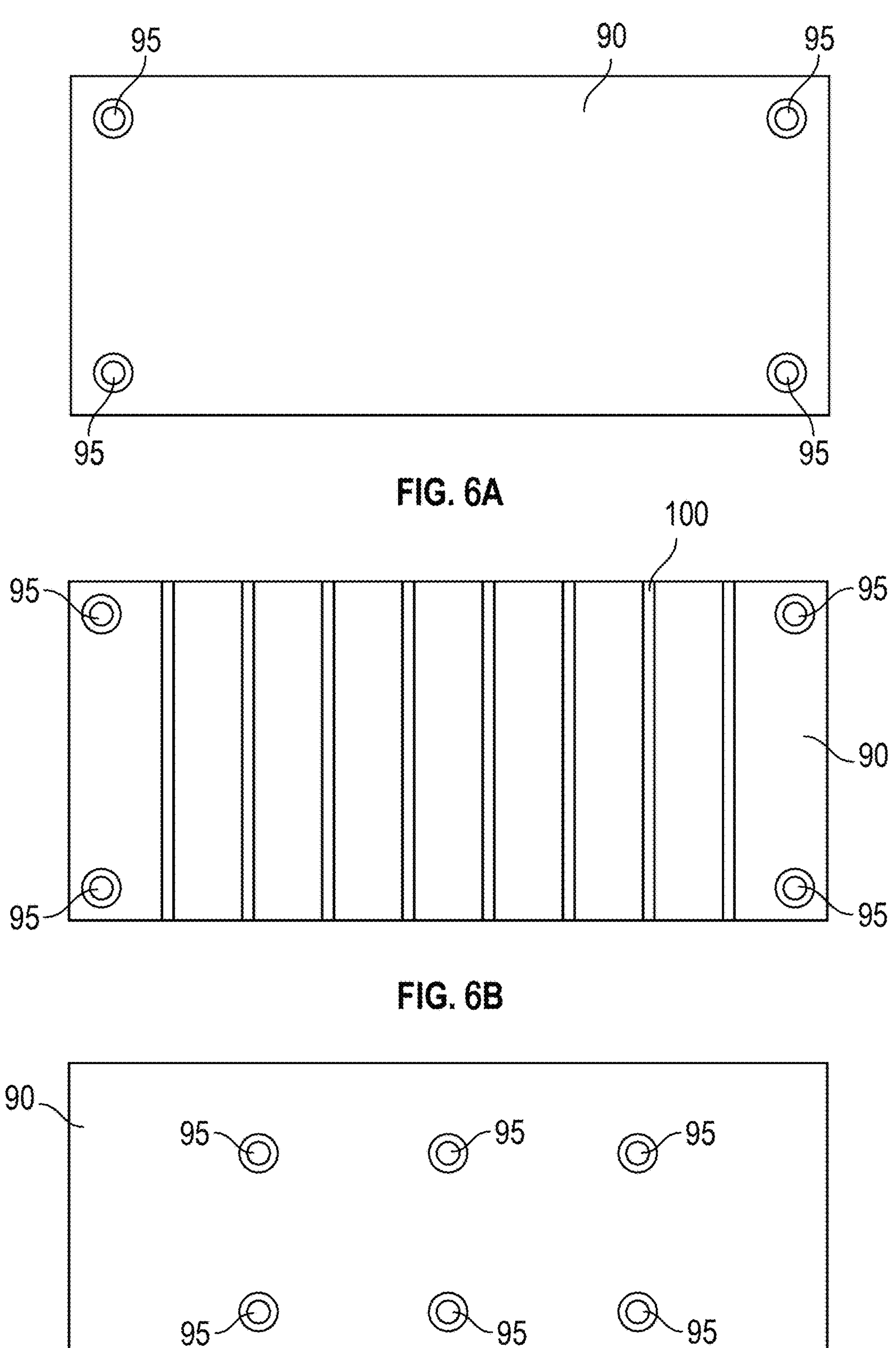
FIG. 6A is a bottom view of a baler scale with four load cells in accordance with an illustrative embodiment of the presently disclosed subject matter.
FIG. 6B is a bottom view of a baler scale with four load cells and a plurality of grooves formed therein in accordance with an illustrative embodiment of the presently disclosed subject matter.
FIG. 6C is a bottom view of a baler scale with six load cells in accordance with an illustrative embodiment of the presently disclosed subject matter.

As shown in FIG. 6A, FIG. 6B and FIG. 6C, base 90 of baler scale 85 can have a variety of different shapes and configurations. For example, base 90 can have a rectangular shape which generally corresponds to the shape of floor 70 inside baler 10 to ensure a secure fit. Base 90 can also have other shapes or configurations, as desired. For example, base 90 can be modular, and can comprise a plurality of different smaller segments that fit together to form a whole, or the smaller segments can be utilized independently or in groups of two, three, four or more to cover certain areas of floor 70. The modular design for base 90 can facilitate ease of installation for baler scale 85 on floor 70.

In certain illustrative embodiments, one or more load cells 95 can be positioned in a variety of different locations under base 90. For example, in FIG. 6A and FIG. 6B, load cells 95 are located at or near the four corners of rectangular-shaped base 90. In FIG. 6C, load cells 95 are located at or near the middle of rectangular-shaped base 90.

Moreover, the number of load cells 95 can vary. In FIG. 6A and FIG. 6B, four (4) load cells 95 are used, whereas in FIG. 6C, six (6) load cells 95 are used. The number and location of load cells 95 under base 90 can be moved, adjusted or rearranged as needed in order to effectively measure and determine the weight of the recyclable materials that sit atop baler scale 85.

In certain illustrative embodiments, such as shown in FIG. 6B, base 90 can have a plurality of elongated grooves 100 formed therein. Grooves 100 can be aligned in a parallel orientation with one another, and can correspond to the location of the floor gaps 80 between the raised section 75 on floor 70 of baler 10.

Figure 7:
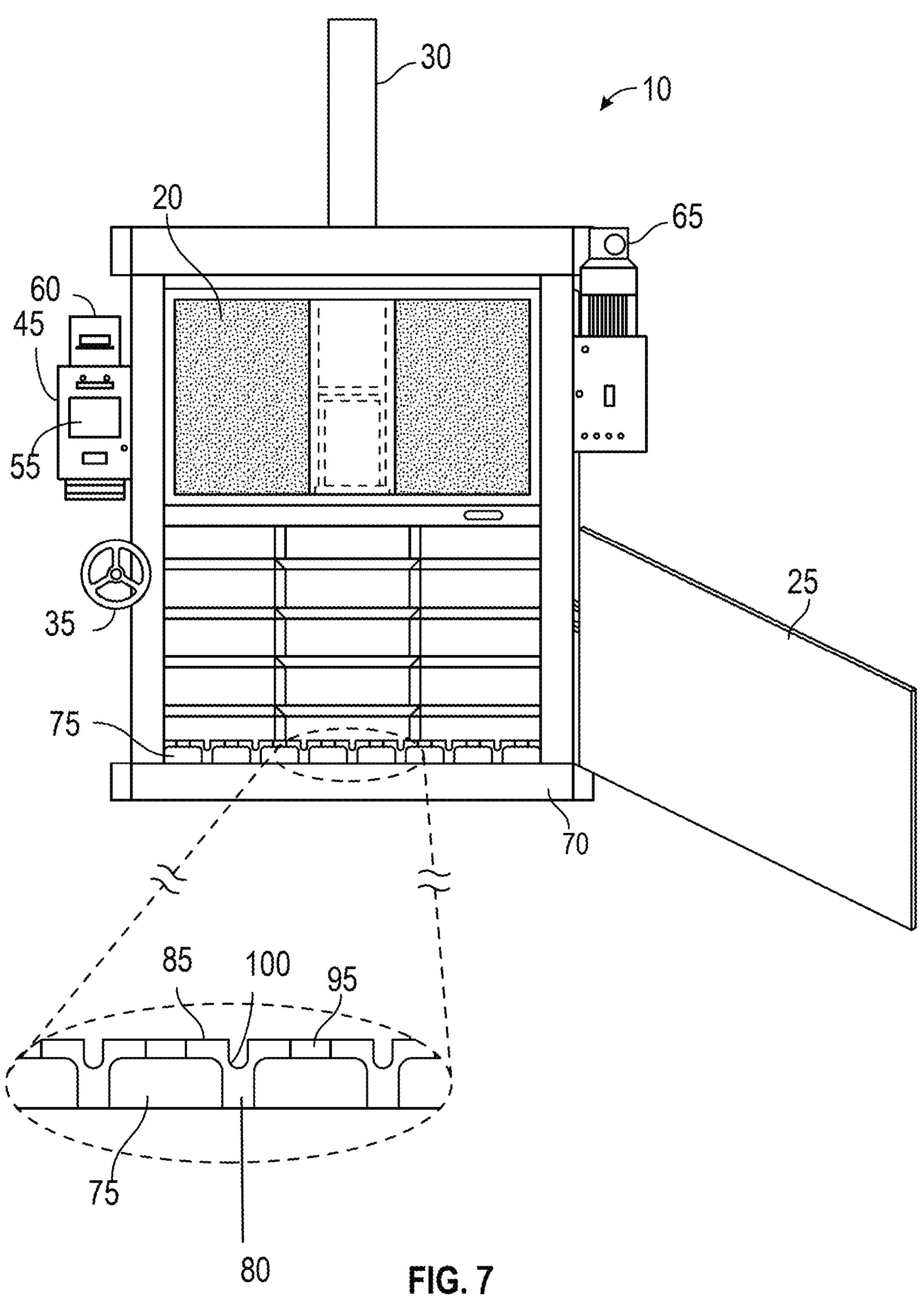
FIG. 7 is a front view of a baler with the door in an open position and a baler scale located inside the baler on the baler floor in accordance with an illustrative embodiment of the presently disclosed subject matter.

Thus, as shown in FIG. 7, when baler scale 85 with load cells 95 sits atop the raised section 75 on floor 70 inside of baler 10, grooves 100 align with, and sit within, floor gaps 80, and the baling wire under the bale of compressed material can sit within grooves 100 instead of within floor gaps 80, and remain relatively unobstructed.

In certain illustrative embodiments, baler 10 for compressing recyclable materials can include an internal chamber having a volume defined by a front door 25, a rear wall, a pair of side walls, a floor 70 comprising a plurality of individual raised sections 75 and a plurality of floor gaps 80 at spaced-apart intervals between the individual raised sections 75, and a piston face 31 moveable by a piston 30 and configured to compress the recyclable materials within the internal chamber to form a bale, and a baler scale 85 comprising a base 90 and one or more load cells 95, wherein the baler scale 85 is configured to sit atop the floor 70 and within the internal chamber, and wherein the one or more load cells 95 are disposed beneath the base 90 and the individual raised sections 75, and wherein the one or more load cells 95 are configured to measure a weight of the recyclable materials when the recyclable materials rest atop the base 90.

Figure 8:
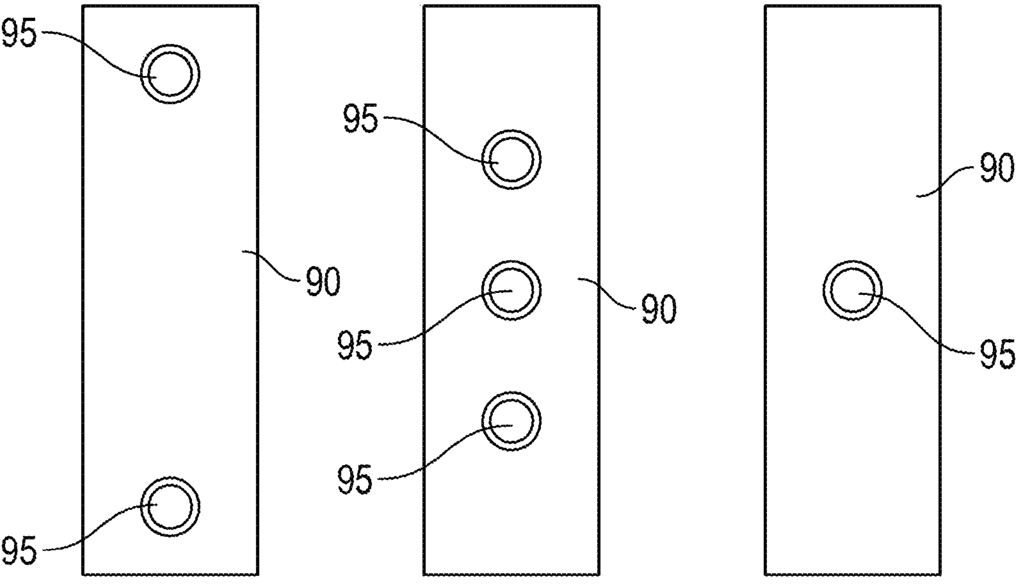
FIG. 8 is a bottom view of three elongated baler scales with two load cells, three load cells and one load cell, respectively, in accordance with illustrative embodiments of the presently disclosed subject matter.
Figure 9:
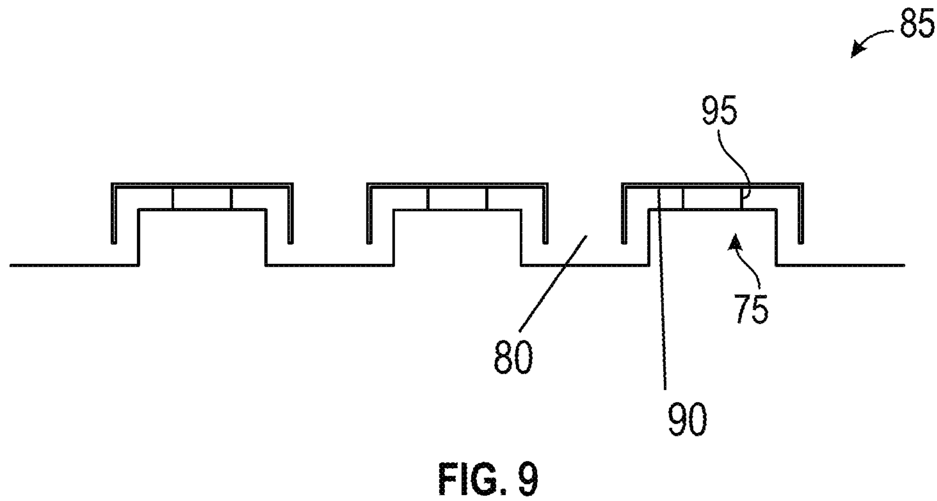
FIG. 9 is a side view of a baler floor with elongated baler scales positioned atop the individual raised sections of the baler floor in accordance with an illustrative embodiment of the presently disclosed subject matter.

In certain illustrative embodiments, base 90 can be shaped such that more than one baler scale 85 can be used inside baler 10 concurrently. For example, as shown in FIG. 8 and FIG. 9, base 90 can have a narrow, elongated center section with a pair of raised walls forming an inverted U-shape. One or more load cells 95 can be positioned in various locations along the center section of base 90, on the side of base 90 having the pair of raised walls. This shape of base 90 will generally correspond to the shape of a single raised section 75 on floor 70 of baler 10. Thus, as shown in FIG. 9, each raised section 75 can have its own baler scale 85 sitting thereon. In the embodiment shown in FIG. 8 and FIG. 9, floor gaps 80 are not fully covered by baler scale 85 and remain partially exposed. In other illustrative embodiments (not shown), two or more adjacent raised sections 75 can be covered by a single baler scale 85 having a widened (but still narrow), elongated center section, or non-adjacent raised sections 75 can each be covered by their own separate baler scale 85. The number and location of baler scales 85 can be adjusted or arranged as needed in order to effectively measure and determine the weight of the recyclable materials within baler 10.

In certain illustrative embodiments, baler 10 can include additional features such as described in U.S. Pat. Publication No. 2021/0170707 titled "Smart Baler", published Jun. 10, 2021, and U.S. Pat. Publication No. 2019/0304236 titled "System And Method For Handling Recyclable Materials", published Oct. 3, 2019, the contents and disclosure of each of which are incorporated by reference herein in their entirety.

The presently disclosed system and method has a number of advantages over existing designs. For example, a baler with an internally disposed baler scale according to the illustrative embodiments described herein is accurate, efficient and reduces safety concerns for users. The baler scale is also conveniently located and easy to install and/or remove.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims associated with this or any related application.

What is claimed is:

1. A baler for compressing recyclable materials, comprising:

an internal chamber having a volume defined by a front door, a rear wall, a pair of side walls, a floor comprising a plurality of individual raised sections and a plurality of floor gaps at spaced-apart intervals between the individual raised sections, and a piston face moveable by a piston and configured to compress the recyclable materials within the internal chamber to form a bale; and a baler scale comprising a base and one or more load cells, wherein the base comprises an elongated center section and a pair of raised walls, and wherein the one or more load cells are disposed on the elongated center section, and wherein the baler scale is configured to sit atop one of the plurality of individual raised sections and within the internal chamber such that the pair of raised walls fit within the floor gaps on either side of the individual raised section where the baler scale sits, and wherein the one or more load cells are disposed beneath the base and above the individual raised section where the baler scale sits, and wherein the one or more load cells are configured to measure a weight of the recyclable materials when the recyclable materials rest atop the base.

2. The baler of claim 1, wherein the one or more load cells are operatively connected to a computer panel and a display screen to communicate data regarding the weight of the recyclable materials being baled.

3. The baler of claim 1, wherein a plurality of baler scales sit atop the floor and within the internal chamber.

* * * * *